United States Patent [19]

Inada et al.

[11] 4,039,290

[45] Aug. 2, 1977

[54] SPENT ACTIVATED CARBON REGENERATOR

[75] Inventors: Satoshi Inada, Ichigayadai; Mituo Amano, Hino; Tadashi Onuma, Ohyaguchikami, all of Japan

[73] Assignee: Kureha Kagaku Kogyo Kabushiki Kaisha, Nihonbashi, Japan

[21] Appl. No.: 695,406

[22] Filed: June 14, 1976

Related U.S. Application Data

[63] Continuation-in-part of Ser. No. 472,097, May 22, 1974, abandoned, which is a continuation-in-part of Ser. No. 359,535, May 11, 1973, abandoned.

[30] Foreign Application Priority Data

May 15, 1972  Japan .................................. 47-47177
Feb. 28, 1974  Japan .................................. 49-22833

[51] Int. Cl.² .................... B01D 15/06; B01J 8/26; B01J 37/12; B05B 1/26
[52] U.S. Cl. .................................... 23/284; 23/288 S; 34/57 A; 55/443; 239/499; 239/689; 252/417; 261/98; 432/58
[58] Field of Search ................. 23/284, 288 B, 288 S, 23/277 R; 252/417; 423/659 F; 34/57 A; 432/58; 427/213; 239/499, 504, 518, 524, 662, 689; 55/443; 261/98, 111

[56] References Cited

U.S. PATENT DOCUMENTS

| 2,455,561 | 12/1948 | Creelman ................. 23/288 S UX |
| 2,503,788 | 4/1950 | White ............................ 23/284 |
| 2,687,343 | 8/1954 | Crask et al. .................. 23/288 S |
| 2,728,632 | 12/1955 | Matheson .................. 23/288 S X |
| 3,529,941 | 9/1970 | Tobiassen et al. ........... 239/504 X |
| 3,749,380 | 7/1973 | Strom et al. ................ 23/284 X |

*Primary Examiner*—Joseph Scovronek
*Attorney, Agent, or Firm*—Lane, Aitken, Dunner & Ziems

[57] ABSTRACT

A fluidized bed type spent activated carbon regenerator with an upper drying chamber and a lower reactivating chamber within a column through which spent activated carbon particles are treated in a fluidized state. The regenerator has a distributor at the lower end of a spent carbon feed pipe which opens into the upper chamber to distribute the feed of spent activated carbon uniformly on all sides of the feed pipe and over a larger area in the upper chamber. A hood is mounted around an upper end of a first overflow pipe which provides a passage to the lower chamber for carbon particles devolatilized in the upper chamber to block shortpasses of incompletely devolatilized carbon particles to the lower chamber. The regenerator is further provided with a louver strainer at the ceiling of the upper chamber to block fine carbon powder which tends to leave the regenerator entrained in upward streams of a regeneration gas flowing through the upper chamber toward a gas outlet at the top of the regenerator.

6 Claims, 7 Drawing Figures

4,039,290

SPENT ACTIVATED CARBON REGENERATOR

CROSS-REFERENCE TO RELATED APPLICATIONS:

This application is a continuation-in-part of our co-pending application, U.S. Ser. No. 472,097, filed May 22, 1974 and entitled A METHOD FOR THE REGENERATION OF SPHERICAL OR BEADLIKE ACTIVATED CARBON, now abandoned, which is a continuation-in-part of our application U.S. Ser. No. 359,535, filed May 11, 1973 and entitled AN ACTIVE CARBON RECLAIMING FURNACE, now abandoned. It also claims priority of Japanese Patent Application No. 47177/1972.

BACKGROUND OF THE INVENTION

This invention relates to regeneration of spent activated carbon, and more particularly to a fluidized bed type regenerator capable of continuously regenerating activated carbon in a fluidized state and with a high yield.

In continuous regeneration of spent activated carbon, it is known in the art to fluidize the spent carbon particles by an oxidative regeneration gas of about 500° C. For example, U.S. Pat. No. 3,700,563 discloses a method of reactivating spent activated coal in a fluidized bed reactor by subjecting the spent activated coal to fluidization under continuous admission of flue gases while maintaining a constant fluidized bed temperature in the outlet region of the reactor by regulating the feed of spent activated coal to the reactor. In another reactivation process disclosed in British Pat. No. 686,294, deactivated charcoal from a desorber is introduced into a reactivation vessel or column in which progressively increasing temperatures prevail to provide a low temperature section, a median temperature section and a high temperature section. As the charcoal flows down the column, it is concurrently caused to contact high temperature flue gases to devolatilize the carbon particles and to remove adsorbed contaminants therefrom.

The usual procedure for cooling the hot carbon particles which have been withdrawn from the reactivator is either to wash them with water in a scrubber or to drop them directly into a water bath.

A serious problem encountered in the reactivation of spent activated carbon in a fluidized bed is that the activated carbon particles are reduced into fine powder due to attrition and collisions while being whirled in the fluidized bed during the desorption and reactivation processes, the fine powder leaving the reactivator or regenerator entrained in the exhaust gases. The entrainment of fine carbon powder in the exhaust gases gives rise to the necessity of gasifying the carbon powder in a combustion furnace upon disposing of the exhaust gases. In spite of the unignorably large amount of activated carbon which is reduced into powder during the reactivation, the conventional methods and apparatus have almost no provision for suppressing powdering of the activated carbon particles under reactivation treatment or for blocking fine carbon powder from being carried away out of the regenerator by the exhaust gases. Lacking such a provision, it is difficult to carry out the regeneration of spent activated carbon with a high yield (e.g., over 90%), and a large consumption of combustion gas is required for gasifying the fine carbon powder in the exhaust gases. For these reasons, the regeneration of spent activated carbon in a fluidized bed has been considered to be disadvantageous from an economical point of view in spite of its inherent merit that a continuous operation is possible.

The present invention contemplates providing means for suppressing the powdering of the activated carbon particles and blocking the escape of fine carbon powder with exhaust gases, in the activated carbon regenerator of the construction disclosed in our copending application U.S. Ser. No. 472,097.

Although the finely powdered activated carbon causes trouble in the reactivation process, it is difficult to remove the fine powder beforehand from the spent activated carbon particles to be fed to the regenerator or to suppress the powdering completely throughout the reactivation process. It is also difficult to filter out and remove all of the fine carbon powder which is entrained in the exhaust gases. The fine powder is unavoidably brought into the regenerator along with the spent activated carbon particles and also produced in a certain amount during the regeneration process. The extent of powdering largely depends on the mechanical and physical properties of the activated carbon particles per se. As a matter of course, it is also influenced by the shape and type of the activated carbon particles to be treated and the interior construction of the regenerator. Activated carbon particles of complicated irregular shapes naturally produce a larger amount of fine powder than particles of simple round or spherical shapes. Regenerators of complicated construction or with exposed ends and edges are undesirable from the standpoint of production of fines. The powdering occurs even when the spent carbon particles are fed to the regenerator, for example, by a screw feeder. The regenerator is normally heated to a temperature of 600° to 900° C so that, if the spent activated carbon particles were admitted into the regenerator in a wet state as usually is the case, they would break up or disintegrate due to thermal shock and impact resulting from abrupt gasification of volatile impurities adsorbed in the pores of the carbon particles. This phenomenon is observed invariably in a fluidized bed type regenerator which has separate drying and reactivating sections or chambers. The powdering also occurs if insufficiently devolatilized carbon particles are allowed to enter the reactivating chamber or to shortcut to the reactivating chamber without remaining in the drying chamber for a sufficient time period to be devotilized.

The drying chamber usually receives the spent activated carbon particles in a wet state continuously, dropped from a hopper through a feed pipe which opens into the drying chamber. Therefore, a considerable temperature drop occurs in the drying chamber in the areas where the wet carbon particles are dropped, and the wet carbon particles which have heavily adsorbed contaminant substances tend to pile up in lumps in the low temperature areas, preventing smooth fluidization of the carbon particles and clogging perforations in the gas dispersing plate at the bottom of the drying chamber. Such stagnation of the wet carbon particles can jeopardize the safe operation of the regenerator and often necessitates frequent interruptions in operation.

It is an object of the present invention to provide a fluidized bed type spent activated carbon regenerator which will overcome the afore-mentioned difficulties and problems and which will permit efficient continuous operation over a long period of time.

SUMMARY OF THE INVENTION

The spent activated carbon regenerator of the invention is designed to prevent powdering of the carbon particles. The regenerator has a generally cylindrical body or column wth a gas inlet and outlet at the bottom and top ends of the column, respectively. The regenerator column is divided into an upper drying chamber and a lower reactivating chamber by perforated gas dispersing plates which are mounted within the regenerator column. Spent activated carbon particles are first admitted into the upper drying chamber through a feed pipe which opens into the upper chamber. The spent activated carbon particles, heavy with adsorbed volatile materials (a major proportion of which is moisture), are fluidized by an oxidative regeneration gas streaming up through the lower reactivating chamber and retained in the upper drying chamber for a suitable time period to volatilize the adsorbed materials before direct contact with the raw hot regeneration gas. After devolatilization in the upper drying chamber, the activated carbon particles are allowed to flow down into the lower reactivating chamber through a first overflow pipe which provides a passage from the upper to lower chamber for the devolatilized carbon particles. In the lower chamber, the carbon particles are also fluidized by the regeneration gas and reactivated by direct contact with the hot gas. The reactivated carbon particles are continuously discharged through a second overflow pipe leading from the lower chamber to the outside through the bottom of the column.

One feature of the invention is a fixed distributor is provided at the lower end of the spent carbon feed pipe which opens into the upper drying chamber to distribute the feed of wet spent carbon particles around the open end of the feed pipe, ensuring smooth fluidization of the carbon particles which would otherwise stagnate in the area immediately beneath the open end of the feed pipe.

The overflow pipe which provides a passage from the upper to the lower chamber for the devolatilized carbon particles is located in a position remote from the spent carbon feed pipe and is provided with a cylindrical hood around its upper end which is disposed in the upper drying chamber. The hood serves to block wet carbon particles from directly entering the overflow pipe without sufficient devolatilization in the upper chamber.

The regenerator of the invention is further provided with a strainer at the top of the upper drying chamber to block fine carbon powder from leaving the regenerator entrained in the exhaust gases. Preferably, the strainer is constituted by a number of blinding or louver plates which are mounted slanted in a fixed frame and entirely cover the top end of the upper drying chamber.

The regenerator of the invention can reactivate spent activated carbon particles with a high yield over 90%. In this connection, it has been found that a higher yield of regenerated activated carbon is attainable with spherical activated carbon beads than ordinary activated carbon particles of diversified shapes which are obtained from pulverized coconut shells because bead-like activated carbon is less susceptible to powdering and superior in mechanical strength due to the round or spherical shape. More specifically, an extremely high yield of over 98% is obtainable with the spherical activated carbon beads which are produced from pitch by the method disclosed by Amagi et al. (in their copending application Ser. No. 401,160 filed on Sept. 27, 1973 which issued as U.S. Pat. No. 3,917,806, on Nov. 4, 1975 and which is assigned to the same assignee as the present invention), the teachings of which are hereby incorporated by reference.

The spent activated carbon regenerator of the present invention comprises: a generally cylindrical column closed at both ends; upper and lower perforated gas dispersing plates mounted across the column and defining an upper drying chamber and a lower reactivating chamber, a gas inlet provided at the bottom of the column for continued admission of an oxidative regeneration gas upwardly through the column; a gas outlet provided at the top of the column for exhaust gases; a spent carbon feed pipe opening at one end into the upper chamber of the regenerator and having the other end connected to a hopper through a suitable feed means; a first overflow pipe extending from the upper to the lower chamber through the upper gas dispersing plate to provide a passage for transferring devolatilized carbon particles from the upper to the lower chamber; a second overflow pipe extending from the lower chamber to the outside through the lower gas dispersing plate and the botton wall of the column to provide a passage for discharging reactivated carbon particles from the lower chamber to the outside; a distributor rigidly mounted on the lower end of the spent carbon feed pipe and having a plural number of openings to distribute the feed of spent activated carbon particles on all sides of the feed pipe; a cylindrical hood mounted around and spaced from the upper end of the first overflow pipe for blocking passage of incompletely devolatilized carbon particles; and a strainer covering the top end of the upper chamber and having a plural number of louver plates fixed on radial frames slanted relative to the longitudinal axis of the column to deflect upward gas streams at least once thereby preventing shortpasses of the gas streams in the longitudinal direction and blocking fine carbon powder which is entrained in the exhaust gases.

The above and other objects, features and advantages of the invention will become apparent from the following particular description and the appended claims, taken in conjunction with the accompanying drawings which show by way of example one preferred embodiment of the invention.

DESCRIPTION OF PREFERRED EMBODIMENT

Figure 1:
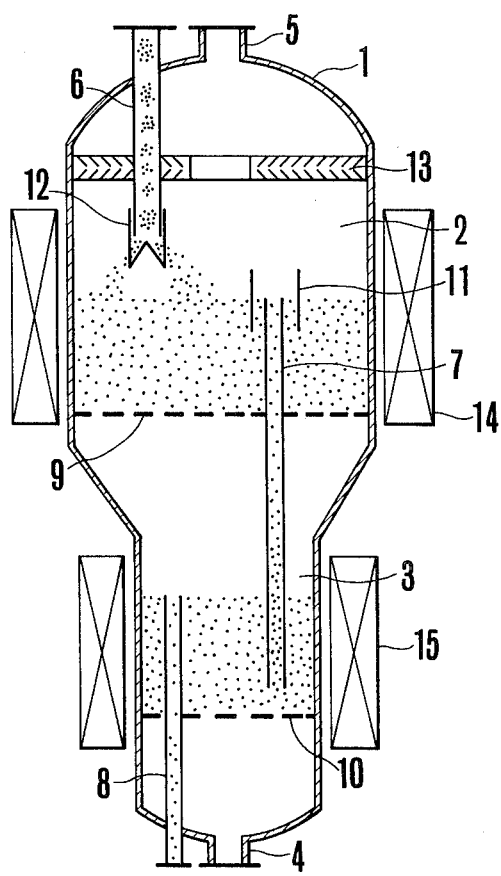
FIG. 1 is a diagrammatic sectional view showing the general construction of the activated carbon regenerator according to the invention.

Referring to the accompanying drawings and first to FIG. 1, the spent activated carbon regenerator includes a column 1 generally of a cylindrical shape. The interior of the column 1 is divided into an upper drying chamber 2 and a lower reactivating chamber 3 by upper and lower perforated plates 9 and 10 which also serve as gas dispersing plates. Spent activated carbon particles to be treated, usually in a slurry form, are fed to the regenerator by suitable feeder means through a spent activated carbon feed pipe 6 which opens into the upper drying chamber 2. Upon entering the upper chamber 2, the wet carbon particles are fluidized by upward streams of a regeneration gas which is continuedly admitted into the column 1 through a gas inlet 4 at the bottom thereof.

While retained in a fluidized state in the upper drying chamber, the volatile materials adsorbed on the carbon particles are desorbed therefrom, and the dried or devolatilized carbon particles are whirled upwardly and allowed to drop into the lower reactivating chamber 3 through a first overflow pipe 7 which extends downwardly through the upper gas dispersing plate 9. The carbon particles are also held in a fluidized state while being reactivated by the regeneration gas from the gas inlet 4. The reactivated carbon particles are continuously discharged through a second overflow pipe 8 which extends downwardly through the lower gas dispersing plate 10 and the bottom wall of the column 1 and dropped, for example, into a water bath which is provided immediately beneath the lower end of the second overflow pipe 8.

The regeneration gas serves to fluidize the carbon particles while drying and reactivating them in the upper and lower chambers. For this purpose, the regeneration gas is admitted through the gas inlet 4 under such a pressure as to establish upward gas streams of a velocity suitable for fluidizing the carbon particles in the upper and lower chambers 2 and 3 on the downstream sides of the upper and lower gas dispersing plates 9 and 10, respectively. Under these circumstances, the fine carbon powder which is unavoidably contained in the activated carbon particles under treatment is entrained in the upward streams of the regeneration gas flowing through the upper chamber toward a gas outlet 5 at the upper end of the column 1. According to the present invention, a louver strainer 13 is mounted across the upper end of the drying chamber 2 as will be described in greater detail, whereby the upward streams of the regeneration gas are deflected more than once and the fine carbon powder entrained in the exhaust gases is caused to stall and drop into the fluidized bed in the upper chamber upon hitting on the surfaces of the louver plates. Thus, the exhaust gases downstream of the strainer 13 contain fine carbon powder only in an inconsequential small amount.

Indicated at 14 and 15 are heating means which are employed for maintaining the internal temperature of the regenerator at a predetermined level.

Figure 2A:
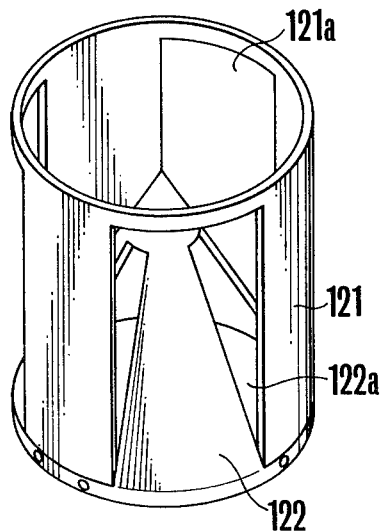
FIG. 2a is a perspective view of a distributor.
Figure 2B:
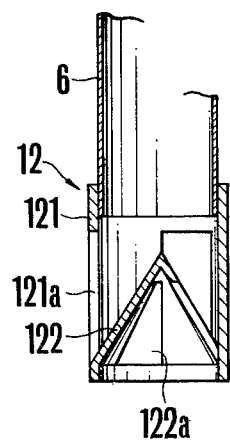
FIG. 2b is a diagrammatic sectional view showing the distributor fit on an end of a spent activated carbon feed pipe.
Figure 2C:
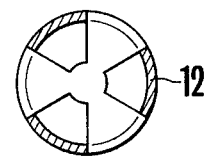
FIG. 2c is a diagrammatic plan view of the distributor.

Referring to FIGS. 2a to 2c a distributor 12 is mounted on the lower end of the spent activated carbon feed pipe 6 which opens into the upper drying chamber 2. The distributor 12 consists of a cylindrical side wall 121 with a suitable number of openings 121a and a conically raised bottom wall 122 with openings 122a between or in staggered positions relative to the openings in the side wall 121. It is desirable that the distributor 12 per se will not rotate in view of the attritional loss of the activated carbon that would be caused by the rotation of the distributor. It has been found that a conical bottom with an apex angle of 45° to 60° gives good results in distributing the spent activated carbon feed over a relatively large area in the upper chamber without stagnation.

As shown in FIG. 1, a cylindrical hood 11 is mounted spaced around the upper end of the overflow pipe 7 which provides a passage to the lower chamber 3 for the carbon particles which have been devolatilized in the upper chamber. The hood 11 serves to block short passes of wet spent carbon particles to the overflow pipe 7 immediately after being admitted into the regenerator through the feed pipe 6 before staying in the upper chamber 2 for a time period sufficient for devolatilization. In addition, the hood 11 serves to regulate the amount of carbon particles which drop into the lower reactivating chamber 3 through the overflow pipe 7 even when the height of the fluidized bed in the upper chamber is changed due to variations in the amount of spent carbon particles fed through the feed pipe 6. In this regard, it has been found that a hood with a sectional area 5 to 10 times greater than that of the overflow pipe 7 gives good results. The height of the hood 11 is normally determined in relation with the feed rate of the spent carbon particles and estimated variations in the velocity of the regeneration gas streams which fluidize the activated carbon particles, but is usually in the range of from 200 to 400 mm. It is preferred to mount the hood 11 so that the upper end of the overflow pipe 7 is positioned intermediate between the upper and lower open ends of the hood 11. Slits or small apertures in the hood reduce the above-mentioned effects and should be avoided.

Figure 3A:
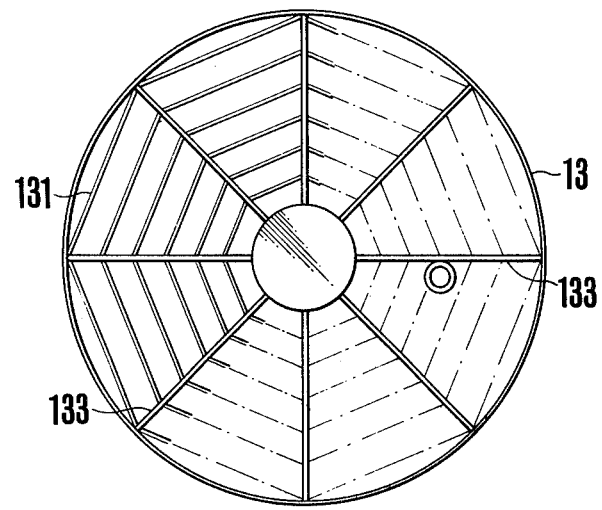
FIG. 3a is a perspective view of the strainer to be mounted at the top of the upper drying chamber of the regenerator.
Figure 3B:
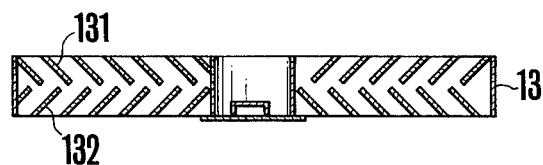
FIG. 3b is a diagrammatic sectional view of the strainer.
Figure 3C:
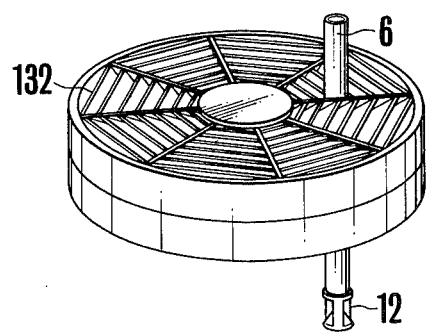
FIG. 3c is a diagrammatic plan view of the strainer.

Referring now to FIGS. 3a to 3c, it is to be understood that the strainer 13 is not limited to the particular construction shown in these figures. In the embodiment of FIG. 3, the strainer 13 has opposing upper and lower louver plates 131 and 132 mounted on radial frames 133. Any other strainer construction may be used as long as it can deflect the streams of the regeneration gas at least once. The fine carbon powder which is entrained in the exhaust gas stalls upon hitting on the louver plates and drops to the fluidized bed in the upper drying chamber 2. The sectional area of the regenerator column may also be expanded at its upper end for the purpose of slowing the regeneration gas. However, this latter expedient is not desirable because the regenerator column becomes too large in size and it is difficult to sufficiently slow the fine carbon powder which rises through the column due to the influence of inertial force.

The louver plates 131 and 132 are preferably mounted on the strainer frames slanted or at a predetermined angle with respect to the longitudinal axis of the regenerator column and have plane surfaces designed to prevent depositing on the louver plate surfaces.

The table below shows the results of spent activated carbon regeneration tests using the regenerator according to the invention and for comparison purposes a conventional fluidized bed type regenerator of similar construction but without the distributor 12, hood 11, and strainer 13. In each test, 500 kg of spent activated carbon used in the treatment of waste liquor of a petrochemical plant was regenerated by continuous operation and under the same conditions.

Table

| | Yield | |
|---|---|---|
| Activated Carbon | Regenerator of Invention | Prior-art Regenerator |
| Spherical or Bead-like Activated Carbon from Pitch | 98 % | 93 % |

Table-continued

| Activated Carbon | Yield Regenerator of Invention | Prior-art Regenerator |
| --- | --- | --- |
| Activated Carbon Particles from Pulverized coconut Shell | 89 % | 85 % |

Size of Regenerators:
Upper chamber : 25 cm (diameter) × 70 cm (height)
Lower chamber : 13 cm (diameter) × 50 cm (height)
Regenerating conditions:
Spent Carbon feeding rate: 10 kg/hr
Upper chamber temperature: 400° C
Lower chamber temperature: 750° C
Regeneration gas: 100% steam
Flow rate: 8 M$^3$/hr
Dimensions of distributor, overflow pipe hood and overflow pipe (only for the regenerator of the invention):
Distributor: 5 cm (diam.) × 4 cm (diam.) (shaped as in FIG. 2)
Overflow pipe hood: 5 cm (diam.) × 10 cm (height)
Overflow pipe: 2 cm (diam.) × 75 cm (height)

The spent bead-like activated carbon had a particle size of 200 to 300 microns and had adsorbed thereon organic materials corresponding to Chemical Oxygen Demand of about 300 mg per unit gram of the activated carbon, with a 110% water content. While, the activated carbon particles from pulverized coconut shells was a commercial product which had a particle size distribution from 0.8 to 2.0 mm and had adsorbed thereon organic materials corresponding to a Chemical Oxygen Demand of about 300 mg per unit gram of the activated carbon, with a 100% water content immediately before being admitted into the regenerator.

The activated carbon particles which had been treated through the upper and lower chambers of the regenerator were dropped directly into a water bath through the second overflow pipe at the bottom of the column for cooling. Almost no fractured or cracked particles were found in the bead-like spherical activated carbon but the activated carbon particles of pulverized coconut shell contained a relatively large amount of fine powder.

Caramel decoloration tests according to Japanese Industrial Standard K-1470 revealed that all of the regenerated activated carbon was restored to an adsorption capacity almost comparable to that of fresh activated carbon.

What is claimed is:

1. A spent activated carbon regenerator comprising:
a closed generally cylindrical column;
upper and lower perforated gas dispersing plates mounted within said column to provide an upper drying fluidized bed and a lower reactivating fluidized bed;
a gas inlet provided at the bottom of said column for continuous admission of an oxidative regenerative gas upwardly through said column;
a gas outlet provided at the top end of said column for discharging exhaust gases;
a feed pipe for introducing a spent activated carbon onto the upper fluidized bed;
an overflow pipe extending through the upper gas dispersing plate to provide a passage for transferring devolatilized carbon particles from the upper bed to the lower bed;
means for discharging reactivated carbon particles from said lower bed;
means for distributing the spent activated carbon particles onto said upper fluidized bed, said distributor means having a generally cylindrical portion with a number of openings spaced around its circumference and a conically shaped bottom wall with openings in staggered positions relative to said openings in said cylindrical portion;
a cylindrical hood mounted around and spaced from the upper end of said overflow pipe and positioned so that the upper end of said overflow pipe terminates intermediate the upper and lower ends of said cylindrical hood; and
a strainer mounted within said column interposed between said gas outlet and said upper fluidized bed and having a plurality of louver plates, said louver plates being slanted relative to the longitudinal axis of said column to remove carbon fines from the exhaust gas stream.

2. The carbon regenerator of claim 1 wherein said conically shaped bottom wall of said distributor has an apex angle of from 45° to 60°.

3. The carbon regenerator of claim 1 wherein said cylindrical hood has a cross-sectional area 5 to 10 times greater than that of said first overflow pipe.

4. The carbon regenerator of claim 1 wherein two of said louver plates are mounted in an opposing relationship.

5. The regenerator of claim 1 wherein said plurality of louver plates of said strainer include a first plurality of louver plates slanted downwardly toward the center of said column and a second plurality of louvered plates slanted upwardly toward the center of said column.

6. The carbon regenerator of claim 1 wherein the base of said conically shaped portion and the lower end of said clindrical portion are located in the same plane.

* * * * *